US012589767B2

(12) United States Patent

Schaefer

(10) Patent No.: US 12,589,767 B2
(45) Date of Patent: Mar. 31, 2026

(54) SYSTEMS AND METHODS FOR GENERATING A DRIVING TRAJECTORY

(71) Applicant: Toyota Jidosha Kabushiki Kaisha, Toyota (JP)

(72) Inventor: Alexander Christoph Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 163 days.

(21) Appl. No.: 18/428,037

(22) Filed: Jan. 31, 2024

(65) Prior Publication Data

US 2025/0242830 A1    Jul. 31, 2025

(51) Int. Cl.
*B60W 60/00* (2020.01)

(52) U.S. Cl.
CPC ....... *B60W 60/001* (2020.02); *B60W 2554/80* (2020.02); *B60W 2556/10* (2020.02); *B60W 2556/45* (2020.02)

(58) Field of Classification Search
CPC .............. B60W 30/10; B60W 60/001; B60W 60/0011; B60W 2552/10; B60W 2554/80; B60W 2554/801; B60W 2556/10; B60W 2556/40; B60W 2556/45; G05D 1/0212; G05D 1/229; G05D 1/2297; G05D 1/244; G05D 1/2446; G05D 1/246; G05D 1/644; G05D 1/646; G08G 1/0129
See application file for complete search history.

(56) References Cited

U.S. PATENT DOCUMENTS

| | | | |
|---|---|---|---|
| 6,385,539 B1 * | 5/2002 | Wilson ................. | G08G 1/0129 |
| | | | 340/905 |
| 8,566,021 B2 | 10/2013 | Smartt | |
| 9,816,823 B2 | 11/2017 | Wang et al. | |
| 9,874,447 B2 | 1/2018 | Phuyal et al. | |
| 10,359,295 B2 | 7/2019 | Stroila et al. | |
| 10,546,400 B2 | 1/2020 | Dorum | |
| 10,579,062 B2 * | 3/2020 | Zhu ..................... | B60W 30/095 |
| 10,761,535 B2 | 9/2020 | Chen et al. | |

(Continued)

FOREIGN PATENT DOCUMENTS

EP          1857780 B1     5/2020

OTHER PUBLICATIONS

Jones et al. "Lane-Level Route Planning for Autonomous Vehicles", International Workshop on the Algorithmic Foundations of Robotics. pp 312-327. 2022.

*Primary Examiner* — Brandon Z Willis

(74) *Attorney, Agent, or Firm* — Christopher G. Darrow; Darrow Mustafa PC

(57)          ABSTRACT

Systems, methods, and other embodiments described herein relate to generating driving trajectories based on vehicle traces through lane gates. In one embodiment, a method includes generating a network of lane gates for a multi-lane road. The method also includes, for a target lane gate in the network, 1) identifying paths of connected lane gates passing through the target lane gate, 2) clustering vehicle traces passing through the target lane gate that have a same trace path, and 3) calculating a lateral position along the target lane gate for a cluster of vehicle traces. The method also includes generating a driving trajectory for the path based on lateral positions for the cluster at multiple lane gates along a path.

20 Claims, 7 Drawing Sheets

(56) References Cited

U.S. PATENT DOCUMENTS

| | | | |
|---|---|---|---|
| 10,832,635 | B2 | 11/2020 | Cheng et al. |
| 10,859,395 | B2 | 12/2020 | Wheeler et al. |
| 11,023,746 | B2 * | 6/2021 | Soni .................... G06V 10/763 |
| 11,127,292 | B2 | 9/2021 | Bai et al. |
| 11,409,292 | B2 * | 8/2022 | Dorum ................... G01C 21/32 |
| 11,420,649 | B2 | 8/2022 | Dorum et al. |
| 11,578,982 | B2 | 2/2023 | Milici |
| 11,609,095 | B2 | 3/2023 | Andréoli et al. |
| 11,619,943 | B2 | 4/2023 | Jing et al. |
| 11,704,897 | B2 | 7/2023 | Soni et al. |
| 11,796,342 | B2 | 10/2023 | Daniel |
| 11,808,581 | B2 | 11/2023 | Hansson et al. |
| 2014/0095062 | A1 | 4/2014 | Wang et al. |
| 2018/0240335 | A1 | 8/2018 | Dong et al. |
| 2021/0383136 | A1 * | 12/2021 | Zhang ............. B60W 30/18163 |
| 2021/0403001 | A1 * | 12/2021 | Del Pero ............ G01C 21/3815 |
| 2022/0161817 | A1 | 5/2022 | Anastassov |
| 2022/0207996 | A1 | 6/2022 | Xu et al. |
| 2023/0126317 | A1 | 4/2023 | Millington |
| 2023/0244237 | A1 | 8/2023 | Jing et al. |

* cited by examiner

SYSTEMS AND METHODS FOR GENERATING A DRIVING TRAJECTORY

TECHNICAL FIELD

The subject matter described herein relates, in general, to generating driving trajectories for autonomous driving vehicles and, more particularly, to generating driving trajectories based on roadway lane gates and vehicle traces through lane gates.

BACKGROUND

Some vehicles may have systems and devices that allow for semi-autonomous or autonomous vehicle control. In an autonomous mode, a vehicle is controlled and/or maneuvered along a travel route via a computing system with minimal or no input from a human driver. For example, the computing system may control the longitudinal and lateral movement of the vehicle as it traverses a roadway based on sensor data collected from onboard vehicle and environmental sensors. In a semi-autonomous mode, the computing system provides a portion of the control and/or maneuvering of the vehicle along a travel route, with a vehicle operator providing at least another portion of the control and/or maneuvering of the vehicle. As an example, a semi-autonomous vehicle may perform adaptive cruise control where, after initiation and setting of cruise control of a vehicle, the computing system adjusts the following speed of the ego vehicle based on the distance and quantity of vehicles in front of the ego vehicle.

SUMMARY

In one embodiment, example systems and methods relate to a manner of improving the generated driving trajectories for an autonomous vehicle by basing such on vehicle traces that have traversed the same path that the autonomous vehicle is to traverse.

In one embodiment, a trajectory generation system for generating autonomous vehicle driving trajectories based on clustered vehicle traces is disclosed. The trajectory generation system includes one or more processors and a memory communicably coupled to the one or more processors. The memory stores instructions that, when executed by the one or more processors, cause the one or more processors to generate a network of lane gates for a multi-lane road. The memory also stores instructions that, when executed by the one or more processors, cause the one or more processors to, for a target lane in the network, 1) identify paths of connected lane gates passing through the target lane gate, 2) cluster vehicle traces passing through the target lane gate that have a same trace path, and 3) calculate a lateral position along the target lane gate for a cluster of vehicle traces. The memory also stores instructions that, when executed by the one or more processors, cause the one or more processors to generate a driving trajectory for the path based on lateral positions for the cluster at multiple lane gates along a path.

In one embodiment, a non-transitory computer-readable medium for generating autonomous vehicle driving trajectories based on clustered vehicle traces is disclosed. The non-transitory computer-readable medium includes instructions that, when executed by one or more processors, cause the one or more processors to perform one or more functions. The instructions include instructions to generate a network of lane gates for a multi-lane road. The instructions also include instructions to, for a target lane in the network, 1) identify paths of connected lane gates passing through the target lane gate, 2) cluster vehicle traces passing through the target lane gate that have a same trace path, and 3) calculate a lateral position along the target lane gate for a cluster of vehicle traces. The instructions also include instructions to generate a driving trajectory for the path based on lateral positions for the cluster at multiple lane gates along a path.

In one embodiment, a method for generating autonomous vehicle driving trajectories based on clustered vehicle traces is disclosed. In one embodiment, the method includes generating a network of lane gates for a multi-lane road. The method also includes, for a target lane in the network, 1) identifying paths of connected lane gates passing through the target lane gate, 2) clustering vehicle traces passing through the target lane gate that have a same trace path, and 3) calculating a lateral position along the target lane gate for a cluster of vehicle traces. The method also includes generating a driving trajectory for the path based on lateral positions for the cluster at multiple lane gates along a path.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
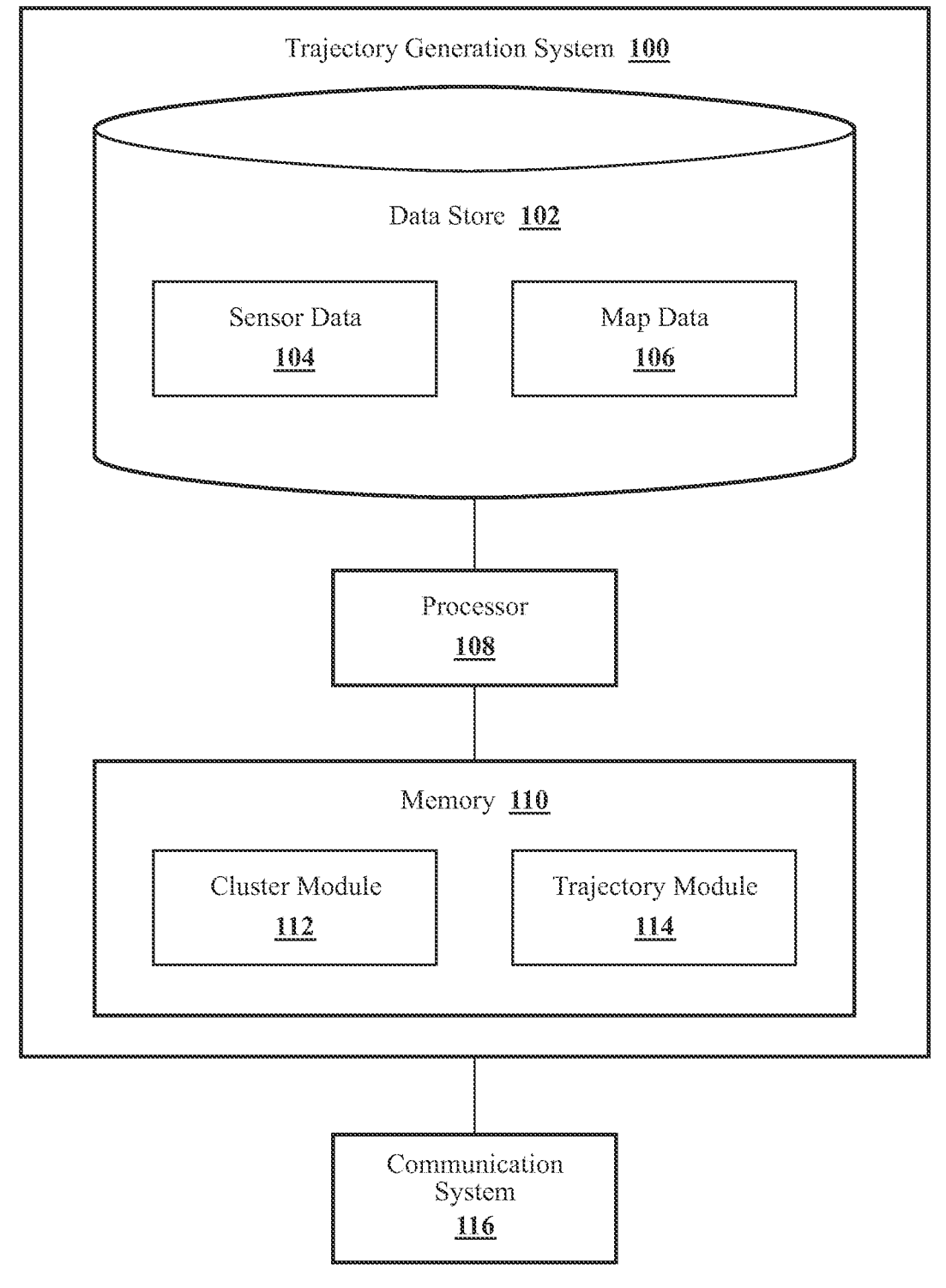
FIG. 1 illustrates one embodiment of a trajectory generation system that is associated with generating autonomous or semi-autonomous vehicle driving trajectories based on the traces of gate-based clusters of vehicles.

Systems, methods, and other embodiments associated with improving driving trajectories for autonomous vehicles by basing such on the combination of traces, or paths, of manually-controlled vehicles that have already traversed the road on which the autonomous vehicle is found are disclosed herein. As previously described, autonomous or semi-autonomous operation of a vehicle entails at least partially controlling a vehicle with a computing system rather than driver input. For example, in an autonomous vehicle, the computing system may control the longitudinal and lateral movement of the vehicle as it traverses a roadway between an origin and a desired destination.

Currently, the generation of driving trajectories may be performed manually, for example, as technicians manually generate the driving trajectories based on map data and/or the observation of drivers operating vehicles during a training phase. Given the increased number and complexity of roadways, which may have multiple lanes that merge, intersect, and/or divide, identifying a driving trajectory for an extensive road network, such as an entire urban city, is time-intensive and complex.

Moreover, these manually generated driving trajectories may be based on incorrect assumptions, such as the assumption that there is no traffic along a roadway. That is, if there were no traffic, an autonomous vehicle may follow a trajectory exactly. However, as few roads are exempt from the occurrence of traffic, these assumptions may not hold in the real world, and any driving trajectory based on such an assumption may be unreliable and ineffective.

As such, the trajectory generation system of the present specification generates driving trajectories for autonomous vehicles based on traveled paths taken by manually operated vehicles. That is, human operators take certain paths along roadways, with the path being followed determined by any number of criteria, including traffic, road conditions, intended destination, etc. Any driving trajectory generated based on actual vehicle traces is sure to account for the various road conditions that a zero-traffic-assuming paradigm would ignore. That is, the trajectory generation system of the present specification improves the determination of driving trajectories for autonomous vehicles by basing such on the tracks of manually operated vehicles.

Specifically, the trajectory generation system identifies driving paths for autonomous vehicles based on lane gates, or intermediate checkpoints within the lanes, established along the roadway. The trajectory generation system generates a network of lane gates per lane with the connectivity between adjacent gates indicated in the network. The trajectory generation system then iterates over all lane gates. In each iteration, the trajectory generation system determines different paths a vehicle may take through the current lane gate, referred to as a target lane gate. For example, for a road segment where two roads merge and then divide, there may be four paths through a target lane gate between the merge point and division point (e.g., 1) a first inlet road to a first outlet road, 2) the first inlet road to a second outlet road, 3) a second inlet road to the first outlet road, and 4) the second inlet road to the second outlet road). The trajectory generation system clusters vehicle traces that map to each path through the target gate. For example, an index may identify each gate, and each path may be defined by a sequence of gate indices that form the path. Vehicle traces that share trace paths, i.e., sequences of gates through which the vehicle passes along the path, are clustered together.

For each cluster, the trajectory generation system combines-averages or calculates the median of—the lateral position of the traces at each lane gate along the path and generates a driving trajectory for each cluster by connecting the lateral position of the traces at each lane gate along the path.

In an example, in addition to generating driving trajectories for the paths based on the vehicle traces, the system may identify other vehicle attributes based on the clustered vehicle traces. For example, the system may identify the average or median speed of the vehicles at different points, the headlight state, the windshield wiper state, and/or other operational characteristics of the vehicles for which the traces are clustered. The trajectory and vehicle attributes may then be relied on by a vehicle computing system to 1) guide the autonomous vehicle along the trajectory and/or 2)

establish vehicle settings for the autonomous vehicle at different points along the trajectory.

In this way, the disclosed systems, methods, and other embodiments improve the generation of autonomous vehicle trajectories by basing such on actual and historic driving behaviors of many operators rather than manually curated and entered settings. As such, the trace-curated trajectories are based on the real-world variety of driving paths to generate smooth driving trajectories.

As used herein, a "vehicle" is any form of transport that may be motorized or otherwise powered. In one or more implementations, the vehicle is an automobile. While arrangements will be described herein with respect to automobiles, it will be understood that embodiments are not limited to automobiles. In some implementations, the vehicle may be a robotic device or a form of transport that, for example, includes sensors to perceive aspects of the surrounding environment, and thus benefits from the functionality discussed herein associated with generating driving trajectories based on past vehicle traces.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the trajectory generation system that is implemented to perform methods and other functions as disclosed herein relating to improving driving trajectories that are followed by autonomous vehicles.

FIG. 1 illustrates one embodiment of a trajectory generation system 100 that is associated with generating autonomous or semi-autonomous vehicle driving trajectories based on the traces of gate-based clusters of vehicles. The trajectory generation system 100 is shown as including a processor 108 that executes instructions to perform the various functions disclosed herein. Additional details regarding processor 108 are described below in connection with FIG. 5.

In one embodiment, the trajectory generation system 100 includes a memory 110 that stores a cluster module 112 and a trajectory module 114. The memory 110 is a random-access memory (RAM), read-only memory (ROM), a hard-disk drive, a flash memory, or another suitable memory for storing the modules 112 and 114. The modules 112 and 114 are, for example, computer-readable instructions that when executed by the processor 108 cause the processor 108 to perform the various functions disclosed herein. In alternative arrangements, the modules 112 and 114 are independent elements from the memory 110 that are, for example, comprised of hardware elements. Thus, the modules 112 and 114 are alternatively application-specific integrated circuits (ASICs), hardware-based controllers, a composition of logic gates, or another hardware-based solution.

Moreover, in one embodiment, the trajectory generation system 100 includes the data store 102. The data store 102 is, in one embodiment, an electronic data structure stored in the memory 110 or another data storage device and that is configured with routines that can be executed by the processor 108 for analyzing stored data, providing stored data, organizing stored data, and so on. Thus, in one embodiment, the data store 102 stores data used by the modules 112 and 114 in executing various functions.

In one embodiment, the data store 102 stores the sensor data 104 upon which the driving trajectories are generated.

That is, as described above, the driving trajectory provided to the autonomous vehicle is based on data collected by vehicles that have previously traversed the path that the autonomous vehicle is to follow. As such, the sensor data 104 includes that data collected by multiple vehicles' sensor systems as they traverse a roadway. In one example, the sensor data 104 includes at least positional information for vehicles traveling across a roadway. For example, the sensor data 104 may include global positioning system (GPS) coordinates such as longitude and latitude coordinates or any other information indicative of the positioning of a vehicle. As another example, the positional information may indicate the vehicle's position relative to the road, such as its distance from the edge of the roadway and/or from the edge of a lane.

Still further, the sensor data 104 may include the output of the environment and vehicle sensors of the vehicle. In general, the vehicle sensors of a vehicle sense information about the vehicle itself. In one or more arrangements, the vehicle sensor(s) include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle.

The sensor data 104 may include data indicative of the state of various vehicle systems. The state of these systems at various lane gates along a road may be used to control the operation of the associated systems of the autonomous vehicle. For example, while traveling through a tunnel along a roadway, motorists or a computing system of a semi-autonomous vehicle may activate the headlights of the vehicle. Data indicative that the headlights are activated, when combined with similar data from other vehicles traveling through the tunnel, may be used to automatically turn on the headlights of the autonomous vehicle as it travels through the tunnel. As another example, vehicle speed may be recorded over time. In an example, the averaged speed value of multiple vehicles that are grouped may be used to set the speed of an autonomous vehicle that is traveling along the same section of road as the grouped vehicles. As such, the sensor data 104 may include this information (e.g., the position of the vehicle, speed of the vehicle, state of a variety of vehicle systems) and other information collected by the sensor system of the vehicle. While particular reference is made to particular sensor data 104, the data store 102 may store a variety of types of sensor data 104 that is collected from vehicle sensors and relied on by the trajectory generation system 100 to generate a driving trajectory for the autonomous vehicle and/or to operate vehicle systems of the autonomous vehicle.

In one embodiment, the data store 102 stores the sensor data 104 along with, for example, metadata that characterizes various aspects of the sensor data 104. For example, the metadata can include time/date stamps from when the separate sensor data 104 was generated and may include identifiers of the sensor data 104 such that the sensor data 104 may be associated with a trace and/or vehicle to which it pertains.

In one embodiment, the data store 102 further includes map data 106. As described above, the trajectory generation system 100 operates by first generating lane gates, or divisions of a roadway. As such, the data store 102 includes the map data 106 across which the lane gates are generated and for which the driving trajectories are generated. The map data 106 is a map of the roadways across a particular region or area and may indicate the connectivity and topology of the road network. Additional details regarding the generation of lane gates are provided below in connection with FIG. 4B.

The trajectory generation system 100 also includes the modules 112 and 114 that when executed by the processor 108 cause the processor 108 to perform the various functions disclosed herein. Specifically, the trajectory generation system 100 includes a cluster module 112 that includes instructions that cause the processor 108 to generate a network of lane gates for a multi-lane road network. That is, as described above, each lane of a road is divided into segments by lane gates. These lane gates serve as the basis by which vehicle traces are clustered together. For example, each lane gate may be assigned an identifier. As vehicles travel along a roadway, they pass through connected lane gates. In other words, a vehicle trace path, or the path that the vehicle traverses across the roadway, is mapped to a sequence of lane gates through which the vehicle passes. Vehicles that share a trace path, or a sequence of connected traces, are grouped. Various vehicle sensor data is also recorded at these lane gates. Specifically, vehicle latitude and longitude may be recorded at the intersection of the vehicle's trace with a lane gate. The combination of the clustered vehicle's positional information at the lane gate is used to determine the lateral position of the generated driving trajectory. Additional details regarding the generation of the network of lane gates are provided below in connection with FIG. 4B.

The cluster module 112 also includes instructions that cause the processor 108 to, for each target lane gate in the network, 1) identify paths of connected lane gates passing through the target lane gate, 2) cluster vehicle traces passing through the target lane gate that have a same trace path, and 3) calculate a lateral position along the target lane gate for a cluster of vehicle traces. That is, as a vehicle traverses a roadway, it passes the target lane gate at a particular lateral position (e.g., a particular distance from an edge of the lane). The combination of the lateral positions of multiple vehicles that are traveling along the same route serves as the basis for the determined lateral position of the driving trajectory for the autonomous vehicle. As such, the cluster module 112 1) groups together vehicle traces for which the lateral positions are to be combined and 2) determines the lateral position of the cluster based on the lateral positions of the individual vehicle traces in the cluster. Additional details regarding path identification, path-based clustering of vehicle traces, and calculation of a lateral position of the cluster at the lane gate are provided below in connection with FIGS. 4C-4E.

In one approach, the cluster module 112 implements and/or otherwise uses a machine learning algorithm. In one configuration, the machine learning algorithm is embedded within the cluster module 112, such as a convolutional neural network (CNN), to perform vehicle clustering over the sensor data 104 from which further information is derived. Of course, in further aspects, the cluster module 112 may employ different machine learning algorithms or implement different approaches for performing the vehicle clustering which can include deep convolutional encoder-decoder architectures, a multi-scale context aggregation approach using dilated convolutions, or another suitable approach that generates vehicle clusters. Whichever particular approach the cluster module 112 implements, the cluster module 112 provides an output with clusters, lateral positions calculated for the clusters, and other vehicle attributes calculated for the clusters.

The trajectory generation system 100 also includes a trajectory module 114 that includes instructions that cause the processor 108 to generate a driving trajectory for the path based on lateral positions for the cluster of vehicle traces at multiple lane gates along a path. That is, the trajectory generation system 100 iteratively processes each lane gate to identify the lateral position for the clusters that pass through the lane gate. Once the lateral positions of a cluster are identified at connected lane gates, the trajectory module 114 connects those lateral positions to define a portion of the driving trajectory for the autonomous vehicle. Additional details regarding the connection of cluster lateral positions to determine a driving trajectory are provided below in connection with FIGS. 4E and 4F.

As the trajectory module 114 determines the driving trajectories for a path based on clustered vehicle traces and their respective lateral positions along the path, the trajectory module 114 receives the output of the cluster module 112, which output may indicate the clusters, lateral positions of the clusters, and other vehicle attributes of the clusters from which the driving trajectory and other control information are generated.

In one or more configurations, the trajectory generation system 100 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the trajectory generation system 100 or another system generally trains the machine learning algorithm according to a particular training approach, which may include supervised training, self-supervised training, reinforcement learning, and so on. In contrast to training/learning of the machine learning algorithm, the trajectory generation system 100 implements the machine learning algorithm to perform inference. Thus, the general use of the machine learning algorithm is described as inference.

The trajectory generation system 100 functions in cooperation with a communication system 116. Specifically, via the communication system 116, the trajectory generation system 100 receives sensor data 104 from various vehicles and transmits trajectories to the autonomous vehicle. In one embodiment, the communication system 116 communicates according to one or more communication standards. For example, the communication system 116 can include multiple different antennas/transceivers and/or other hardware elements for communicating at different frequencies and according to respective protocols. The communication system 116, in one arrangement, communicates via a communication protocol, such as a WiFi, dedicated short-range communications (DSRC), vehicle-to-infrastructure (V2I), vehicle-to-vehicle (V2V), or another suitable protocol for communicating between the vehicle and other entities in the cloud environment. Moreover, the communication system 116, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle communicating with various remote devices (e.g., a cloud-based server). In any case, the trajectory generation system 100 can leverage various wireless communication technologies to provide communications to other entities, such as members of the cloud-computing environment.

Figure 2:
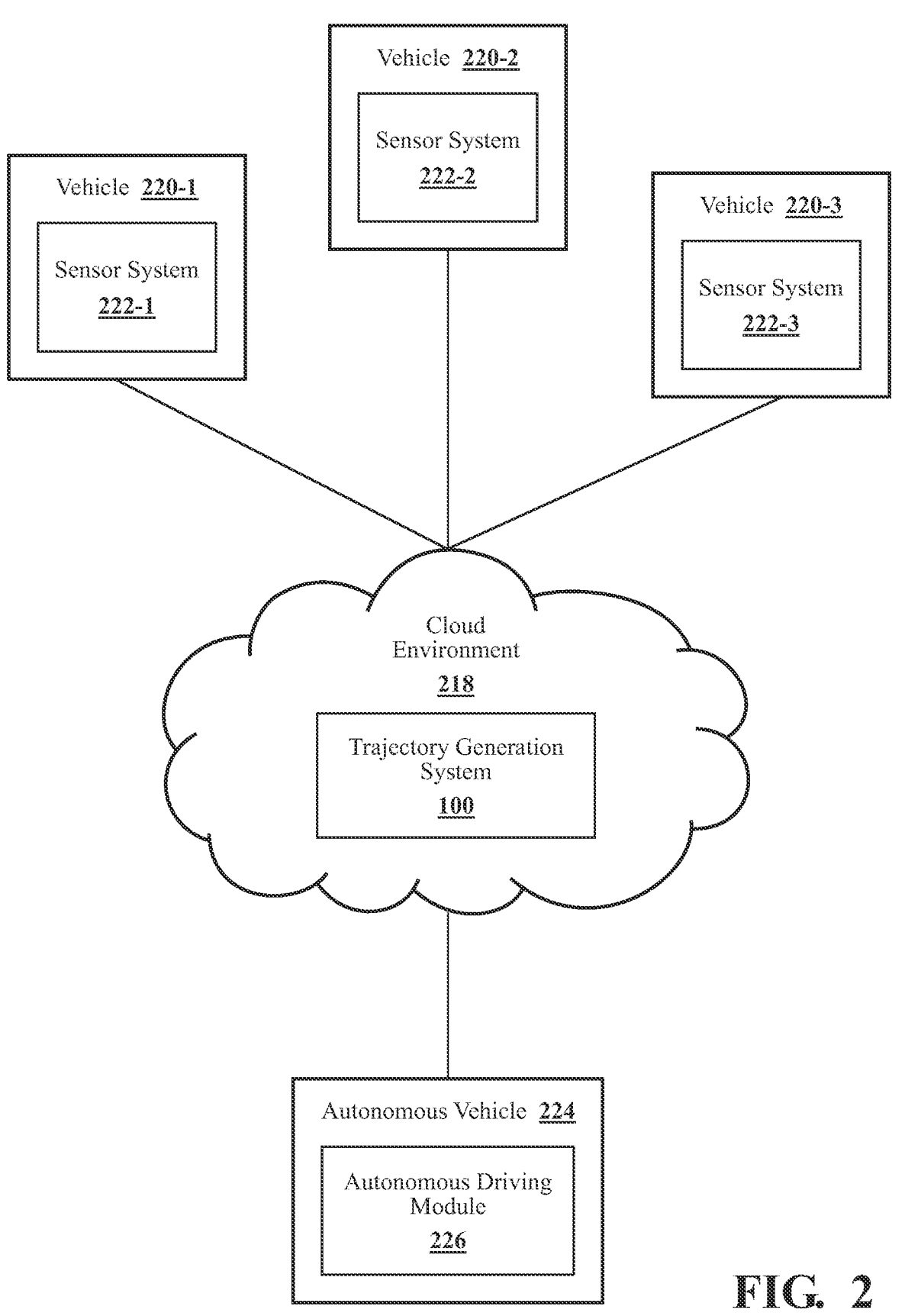
FIG. 2 illustrates one embodiment of the trajectory generation system of FIG. 1 in a cloud-computing environment.

FIG. 2 illustrates one embodiment of the trajectory generation system of FIG. 1 in a cloud-computing environment 218. As described above, in an example, the trajectory generation system 100 is located at a remote system in the cloud environment 218. In this example, the trajectory generation system 100 is connected to the communication system 180 of various vehicles via the communication system 116 of the trajectory generation system 100. For example, the trajectory generation system 100 may acquire sensor data 104 from the sensor systems 222-1, 222-2, and 222-3 of various vehicles 220-1, 220-2, and 220-3. As such, the trajectory generation system 100 generally includes instructions that function to control the processor 108 to receive data inputs from one or more sensors of the vehicles 220. In one embodiment, the inputs are output from various sensors of the sensor systems 222-1, 222-2, and 222-3 of the vehicles 220 and other sensors that monitor the state of the various systems of the vehicles 220. As described above, based on this information, vehicle traces are clustered, and lateral positions for various clustered vehicle traces are calculated.

Also via the communication system 116, the trajectory generation system 100 transmits the calculated driving trajectory for an autonomous vehicle 224 to an autonomous driving module 226 of the autonomous vehicle 224 which, as described below in connection with FIG. 5, controls the various autonomous vehicle 224 systems to maneuver and/or control the autonomous vehicle 224 with little to no driver input.

In a further aspect, the entities that communicate with the trajectory generation system 100 within the cloud-based environment 218 may vary beyond transportation-related devices and encompass mobile devices (e.g., smartphones), and other devices that may be carried by an individual within a vehicle, and thereby can function in cooperation with the vehicle. Thus, the set of entities that function in coordination with the cloud environment 218 may be varied.

Figure 3:
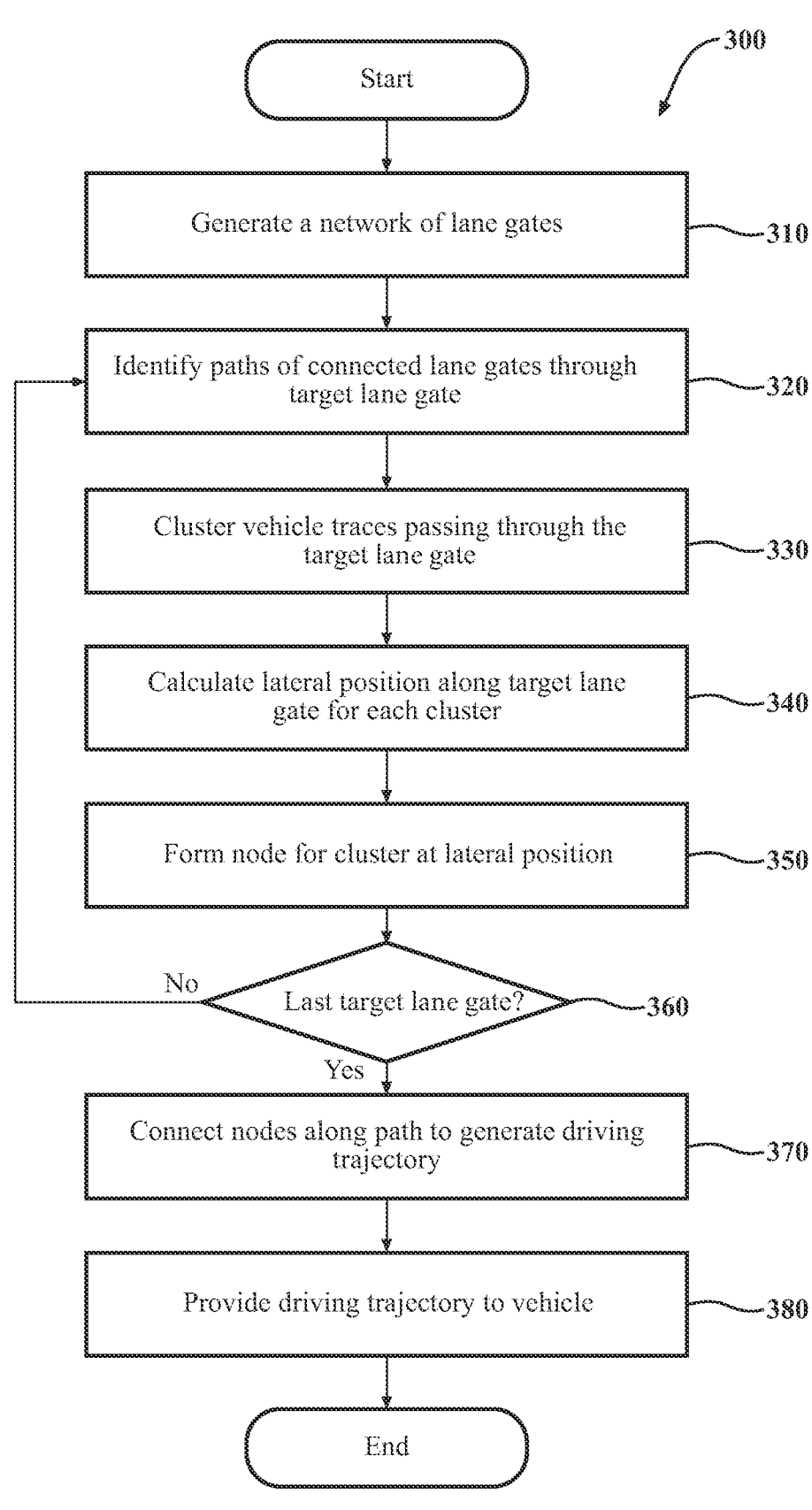
FIG. 3 illustrates a flowchart for one embodiment of a method that is associated with generating autonomous or semi-autonomous vehicle driving trajectories based on the traces of gate-based clusters of vehicles.

Additional aspects of generating trace-based driving trajectories will be discussed in relation to FIG. 3. FIG. 3 illustrates a flowchart of a method 300 that is associated with generating autonomous or semi-autonomous vehicle driving trajectories based on the traces of gate-based clusters of vehicles. Method 300 will be discussed from the perspective of the trajectory generation system 100 of FIGS. 1 and 2. While method 300 is discussed in combination with the trajectory generation system 100, it should be appreciated that the method 300 is not limited to being implemented within the trajectory generation system 100 but is instead one example of a system that may implement the method 300.

At 310, the trajectory generation system 100 generates a network of lane gates for a multi-lane road network. As described above, the lane gates represent locations along a road where a lateral position for a cluster of vehicle traces is calculated. Moreover, as described above, the nodes indicating the lateral position of clusters at connected gates are joined by a line segment, which line segment defines the driving trajectory for an autonomous vehicle. To generate the lane gates, the processor 108 may acquire the map data 106 from the data store 102. In an example, the map data 106 indicates the topology of the roads and the number and position of lanes on the road. The processor 108 may then obtain the geometry of the lanes and segment the lanes of the road by adding transverse lane gates laterally across the individual lanes of a multi-lane roadway indicated in the map data 106. That is, a lane gate spans an individual lane as defined by lane markings, lane barriers, or other lane division elements indicated in the map data 106. In an example, the lane gates may be equidistantly spaced along a longitudinal direction of the respective lane. In an example, the lane gates may be identified by the position (e.g., geographic coordinates) of the end points. In an example, each lane gate is indicated with a unique identifier such that the lane gate may be referenced during path generation, trace clustering, and trajectory generation.

The network of lane gates also indicates a connectivity of lane gates. That is, when traveling along a route, a vehicle may pass through connected lanes. As such, connected lane gates are those for which a vehicle can sequentially pass through without changing lanes. For example, a lane gate in a first lane is not connected to an immediately downstream lane gate in an adjacent lane. In an example, one lane gate may connect to multiple upstream or downstream lane gates, for example in the case of lanes that merge and/or lanes that divide. An example of acquired map data and the generated network of lane gates is depicted below in FIGS. 4A and 4B.

Next, the cluster module 112 iteratively performs a number of operations for each lane gate. In the present specification, a description of these operations is provided in regard to a target lane gate. Once the operations are completed for a target lane gate, the cluster module 112 proceeds to a subsequent lane gate and performs similar operations. Accordingly, at 320, the cluster module 112 identifies paths of connected lane gates passing through a target lane gate. FIG. 4C depicts an example target lane gate (identified by a filled circle) and the paths therethrough. As described above, a road segment may include multiple transitions (e.g., multiple entrances and/or multiple exits), such that there exist multiple paths (i.e., sequences of gates) through the road segment that a vehicle may traverse as it enters and exits the multi-path road segment. In this operation, the cluster module 112 identifies paths that include the target gate lane. In the present specification, a path may be defined by the identifiers of the gates included therein. Note that in this example, a path through a target lane gate may not account for lane changes. That is, the path through a target gate may include the non-lane changing paths through a particular target lane gate.

At 330, the cluster module 112 clusters vehicle traces passing through the target lane gate that have the same trace path. That is, as with the gate paths through the target lane gate are identified by their sequence of lane gates, a vehicle trace may be identified by a sequence of lane gates. For example, a vehicle trace from a sensor system 222 of a vehicle 220 may indicate that the vehicle 220 has passed through various lane gates. Accordingly, the cluster module 112 may append the sensor data 310 with the sequential lane gates that the vehicle 220 traveled by along its route. Those vehicle traces that have similar lane gate sequences are clustered together. For example, a first vehicle trace with a trace path through a first inlet to a first outlet of a lane would be clustered with a second vehicle trace with a trace path through the first inlet to the first outlet. In contrast, a third vehicle trace with a trace path through the first inlet to a second outlet of a lane would not be clustered with the other traces. That is, a clustering of vehicle traces may be based on a comparison of the trace paths (i.e., the sequence of lane gates traversed) of the various vehicles 220 with vehicle traces that have the same trace path being clustered together.

In addition, the clusters of vehicle traces may be paired with an associated path through the target lane gate. For example, the cluster of vehicle traces that have a trace path indicating travel from the first inlet to the first outlet may be paired with the path through the target lane that goes from the first inlet to the first outlet, which similarity is indicated by comparing the sequence of gate identifiers of both the trace paths and the gate path through the target lane gate. As such, at 330, the cluster module 112 communicates with the vehicles 220 to acquire the sensor data 310. FIGS. 4C and 4D below depict the clustering of vehicle traces together and to particular gate paths through the target lane gate.

At 340, the cluster module 112 calculates a lateral position along the target lane gate for each cluster of vehicle traces. That is, each vehicle 220 that passes through a lane gate has a lateral position. The lateral position is dependent upon the vehicle route through the lane gate. For example, a vehicle passing from a first inlet to a first outlet, as depicted in FIG. 4D, may be closer to the edge of the lane than a vehicle passing from a first inlet to a second outlet. In an example, the lateral position of a vehicle as it passes through the lane gate is determined based on sensor data 310, such as GPS coordinates or other positional information collected from the vehicles 220. As such, the cluster module 112 may convert the GPS coordinates or other positional information into a format from which the lateral position of the vehicle within the respective lane may be determined. For example, the cluster module 112 may consider the geographic coordinates of the lane gate endpoints as well as the geographic coordinates of the vehicle trace to determine the lateral position of the vehicle 220 within the lane. In an example, the lateral position may be defined in any number of ways, such as a latitude and longitude or a relative lateral position of the lane. For example, one end of the lane gate may be identified by a 0, and the other end may be identified by a 1. In this example, the lateral position of the vehicle trace and the cluster may be indicated by a fractional value between 0 and 1, indicative of the relative lateral position of the vehicle trace between the endpoints of the lane gate.

The cluster module 112 considers the lateral position of each vehicle trace in a cluster at a point when the cluster intersects the lane gate and generates a representative lateral position for the cluster. In an example, the representative lateral position may be a selected lateral position from a selected vehicle trace of the cluster, an average of the lateral positions of the vehicle traces of the cluster, a median of the lateral positions of the vehicle traces of the cluster, or any other representation. At 350, the cluster module 112 forms a node on the target gate for each cluster, the node being positioned at the representative lateral position for the cluster. In other words, each node is representative of a cluster of vehicle traces and spatially indicates the representative (e.g., averaged, median, or otherwise combined) lateral position of the vehicle traces within that cluster. FIG. 4E depicts various nodes at various lane gates.

As described above, the trajectory generation system 100, in one embodiment, iteratively executes the functions discussed at blocks 320-350 such that each lane gate 434 is processed as a target lane gate 434. Accordingly, at 360, the trajectory generation system 100 determines whether a currently processed target lane gate 434 is the last lane gate to be designated as such. If not, the trajectory generation system 100 returns to operation 320 to repeat the cycle for a subsequent target lane gate. If the currently processed target lane gate is the last of such, at 370, the trajectory module 114 generates a driving trajectory for the path based on the lateral positions for the cluster at multiple lane gates along the path. That is, the trajectory module 114 links the nodes associated with a particular cluster in adjacent lane gates. For example, for a cluster defined as traveling along a first path (i.e., passing from a first inlet to a first outlet), the trajectory module 114 may traverse the series of lane gates along the first path and generate a node at each of the lane gates, where the node indicates the lateral position of the cluster of vehicle traces at that lane gate. The trajectory module 114 then links the nodes of that cluster to form a driving trajectory for the first path. Additional details regarding linking lateral positions of connected lane gates are provided below in connection with FIGS. 4E and 4F.

At 380, the trajectory generation system 100 provides the driving trajectory to a vehicle such as an autonomous vehicle 224. That is, the trajectory generation system 100 includes instructions that cause the processor to guide an autonomous vehicle 224 along the driving trajectory based on the autonomous vehicle track being grouped with the cluster. For example, an operator may input a target destination for the autonomous vehicle 224, which, combined with the origin of the autonomous vehicle 224, defines a route for the autonomous vehicle 224. This route may be associated with a particular path between the origin and destination. An autonomous driving module 226 may associate this path with one of the calculated driving trajectories and guide the autonomous vehicle 224 along such. For example, upon a determination that the autonomous vehicle 224 is to navigate along a route which, in part, includes traveling from a first inlet of a multi-path road segment to a first outlet, the trajectory generation system 100 may provide the vehicle, via the communication system 116, with the driving trajectory from the first inlet to the first outlet, which driving trajectory is based on historically traveled paths by manually-operated vehicles from the first inlet to the first outlet. As such, the trajectory generation system 100 of the present specification generates driving trajectories that are not manually curated and, therefore, are not necessarily reflective of actual driving behaviors but are instead generated based on real-world collected data of actual driving behaviors of human operators.

In addition to transmitting the driving trajectory, the trajectory generation system 100 may provide other information to the vehicle, which additional information may further define the operational settings of the autonomous vehicle 224. For example, in addition to navigating a particular route along a multi-transition road segment, motorists may navigate the route at a particular speed and/or operate other vehicle systems in some particular pattern. For example, motorists may turn on headlights in a particular road segment. As such, the trajectory generation system 100 may collect this and other data at the various lane gates and provide output to the autonomous vehicle 224 indicative of the patterned behavior at the lane gate such that control systems of the autonomous vehicle 224 may be activated in alignment with the behaviors of human-operated vehicles that have traversed the same roadway. That is, the trajectory generation system 100 includes instructions that, when executed by the processor 108, cause the processor to calculate a vehicle attribute for the cluster at the target lane gate based on vehicle attributes associated with the vehicle trace at the target lane gate and generate time-based vehicle attributes for the path by combining vehicle attributes for the cluster at multiple lane gates along the path.

Figures 4A, 4B:
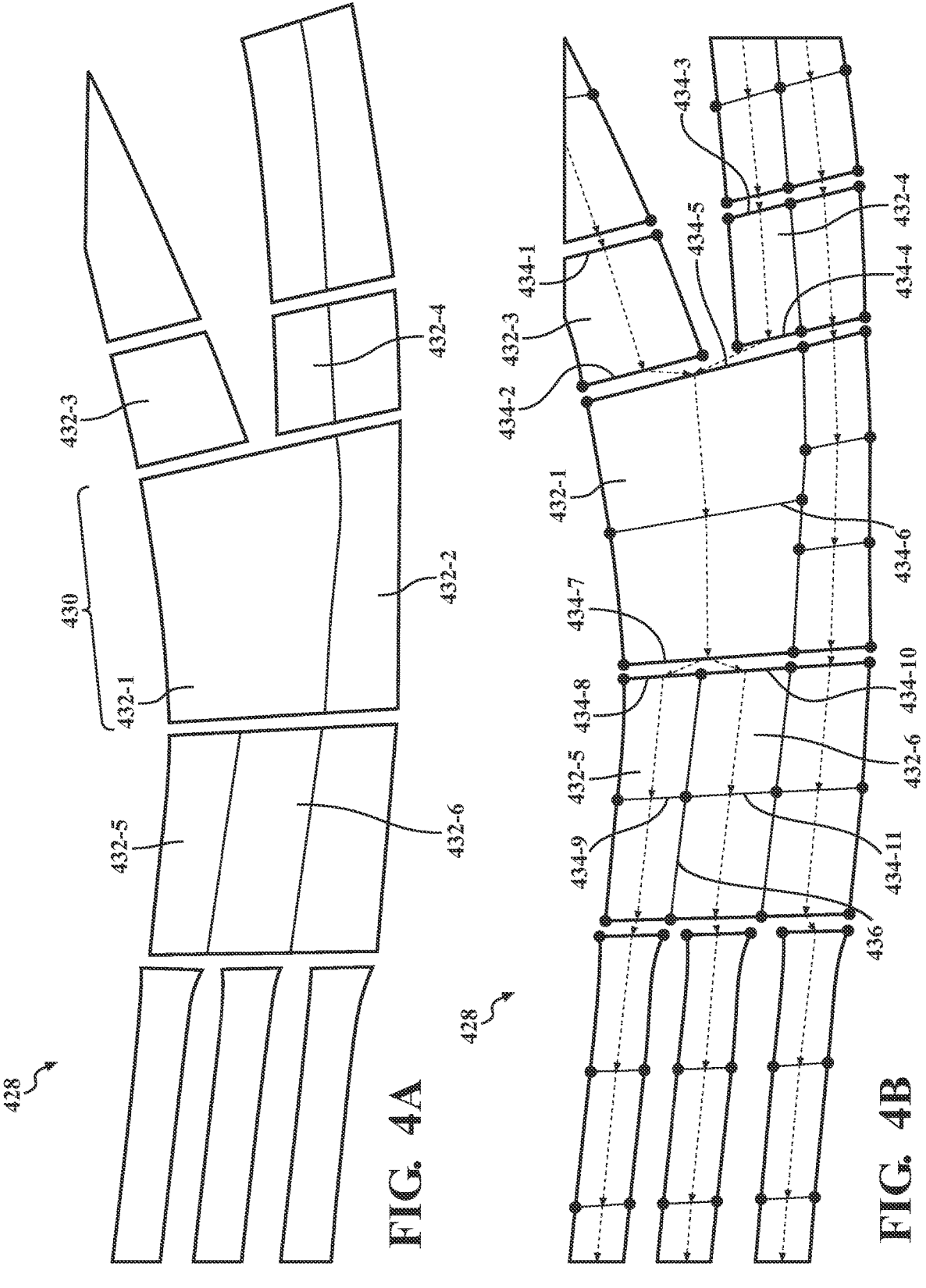
FIGS. 4A-4F depict the trace and gate-based generation of a driving trajectory for an autonomous vehicle.
Figures 4C, 4D:
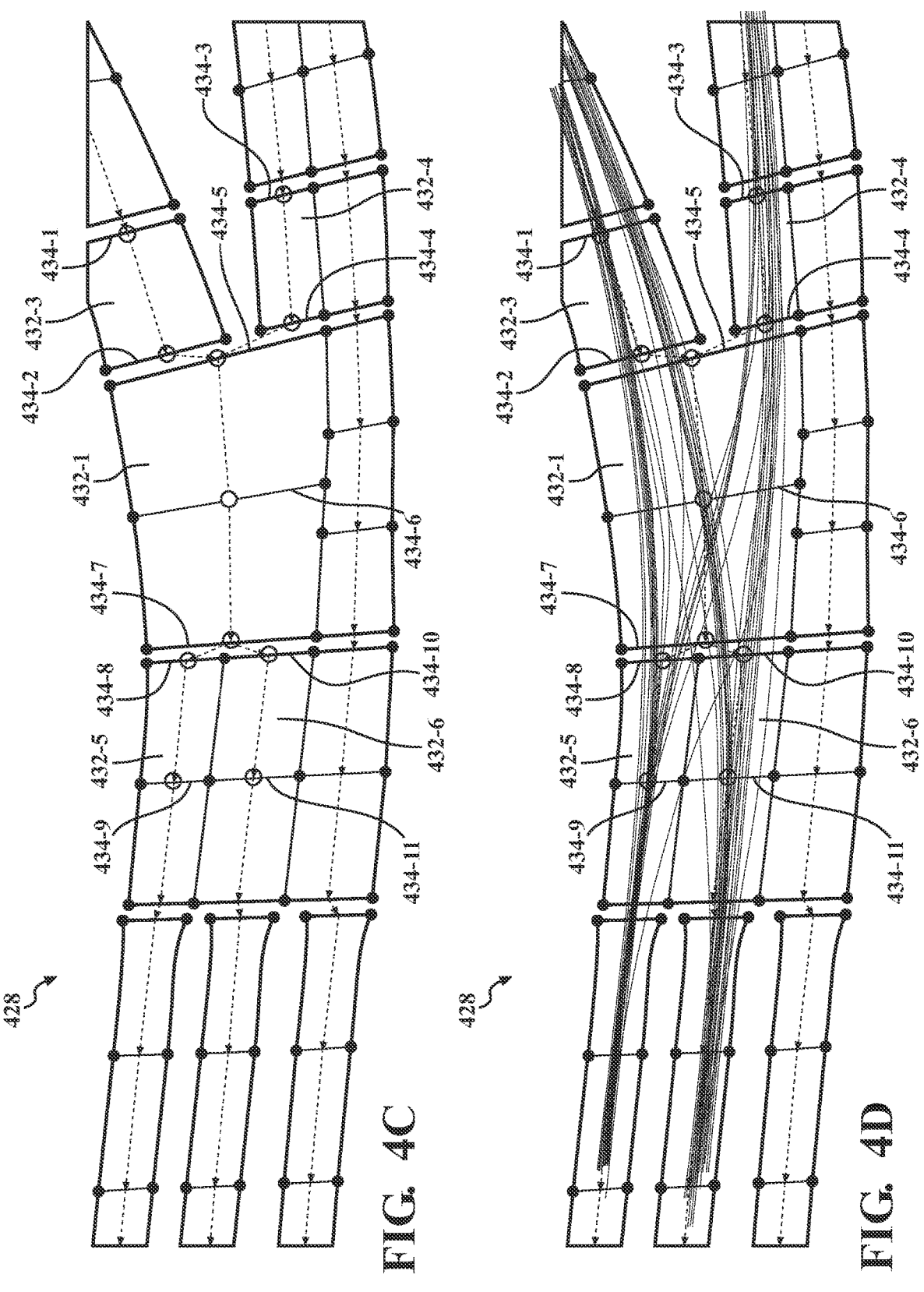
Figures 4E, 4F:
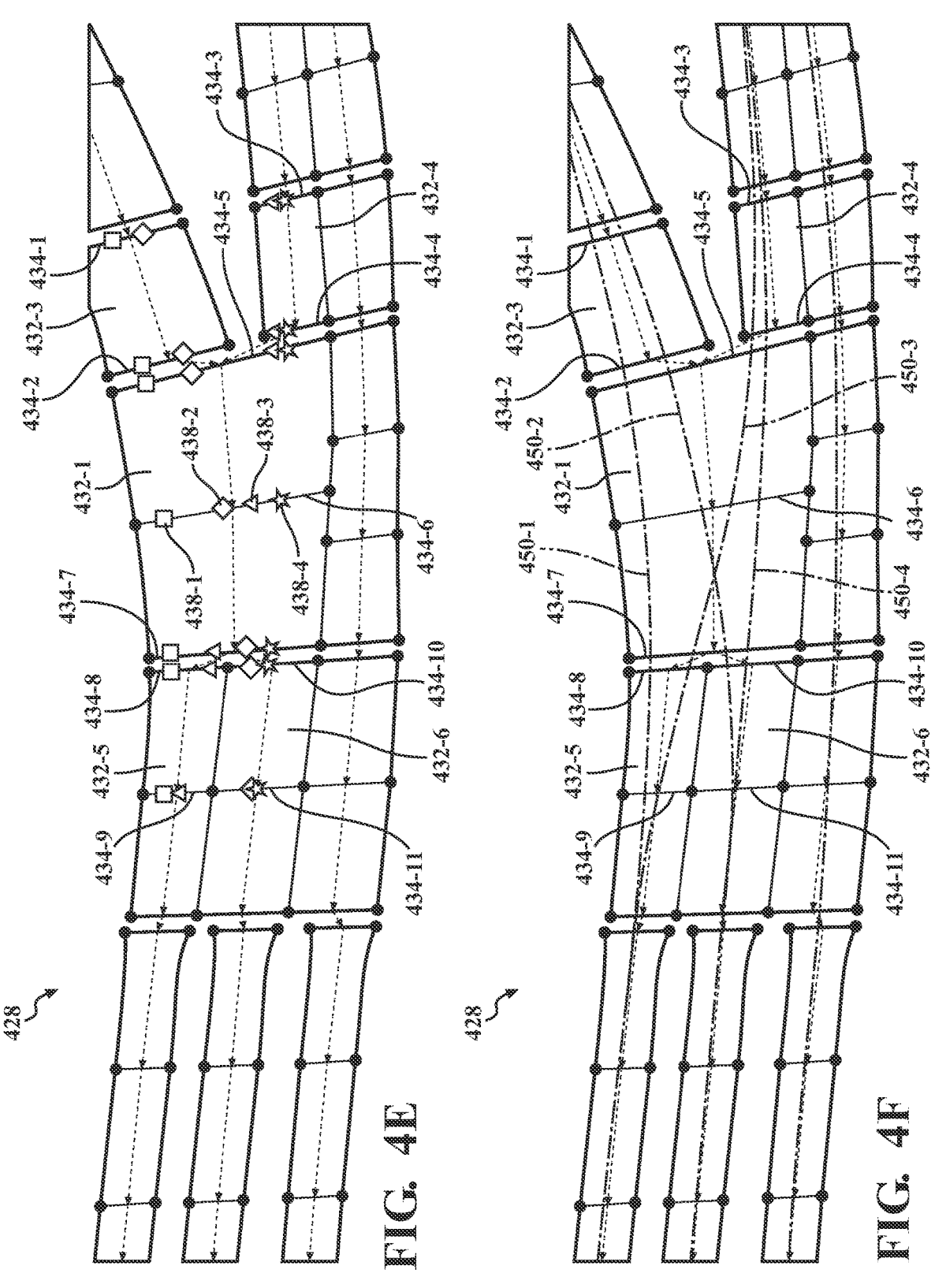

FIGS. 4A-4F depict the trace and gate-based generation of a driving trajectory for an autonomous vehicle 224. FIG. 4A depicts a map 428 of a segment of a road network. As described above, the road network may include various lanes, as shown in FIG. 4A are divided by horizontal barriers (e.g., green space), lane markers (e.g., the horizontal lines in FIG. 4A), or other lane division elements. As described above, some road segments may be defined by multiple entrances and/or exits. For example, as depicted in FIG. 4A, a portion 430 of a road may include a first lane 432-1 and a second lane 432-2 divided by a lane boundary. The second lane 432-2 may have a single inlet lane and a single outlet lane, while the first lane 432-1 has a first inlet lane 432-3 and a second inlet lane 432-4 as well as a first outlet lane 432-5 and a second outlet lane 432-6. As such, the cluster module 112 may include instructions that cause the processor 108 to generate the network of lane gates across at least one of a multi-entrance segment of the multi-lane road and a multi-exit segment of the multi-lane road. For simplicity in illustration, a few instances of portions 430 and lanes 432 are indicated with reference numbers throughout the specification.

FIG. 4B depicts the generation of lane gates 434 and the indication of the connectivity of such across the map 428. For simplicity in illustration, a few instances of lane gates 434-1, 434-2, 434-3, 434-4, 434-5, 434-6, 434-7, 434-8, 434-9, 434-10, and 434-11 are indicated with reference numbers. However, lane gates 434 are generally indicated as lines perpendicular to the corresponding lane 432. As described above, the lane gates 434 are transverse divisions of lanes 432 of a road network. As such, the cluster module 112 includes instructions that cause the processor 108 to acquire a road map 428 of a multi-lane road network and segment the lanes 432 of the road map 428 into equidistant segments. In other words, the roads of the road map 428 are partitioned into equal distance segments. This may be done by processing the geometries of the road network and sampling such at a fixed distance, which distance may be a predetermined value based on the characteristics of the road network. As described above, the lane gates 434 are per lane. That is, an individual lane gate 434 does not span multiple lanes 432.

The network of lane gates 434 also indicates the connectivity of various lane gates 434. For example, a second lane gate 434-1 and a fourth lane gate 434-4 may each be connected to a fifth lane gate 434-5 as indicated by respective arrows. However, an eighth lane gate 434-8 is not connected to an eleventh lane gate 434-11 because of the horizontal lane barrier 436. As such, the connectivity of the lane gates 434 indicates in-lane paths that a vehicle may take to traverse the road network. Note that there may be multiple in-lane paths given that some lanes 432, such as the first lane 432-1 have multiple transitions into and out of the lane 432.

FIG. 4C depicts the identified paths through a target lane gate. In the example depicted in FIG. 4C, the target lane gate is a sixth lane gate 434-6, as indicated by the solid circle. As described above, the cluster module 112 identifies the in-lane paths through the target lane gate and uses such as a basis for vehicle trace clustering. As described above, a lane may have multiple entrances and exits such that there are multiple paths through the lane. The trajectory generation system 100 generates trajectories for each of these paths as the desired position for the autonomous vehicle 224 as it navigates through the first lane 432-1 depends on which path it is to take.

The paths may be defined by the sequence of lane gates 434 that make up the path. For example, each lane gate 434 may be provided with an identifier such that the path may be defined by the lane gates along that path. For example, a first path from the first inlet lane 432-1 to the first outlet lane 432-5 may be defined by the identifiers of the gates (e.g., 434-1, 434-2, 434-5, 434-6, 434-7, 434-8, 434-9) that fall along that path. Similarly, a second path from the first inlet lane 432-1 to the second outlet lane 432-6 may be defined by the identifiers of the gates (e.g., 434-1, 434-2, 434-5, 434-6, 434-7, 434-10, 434-11) that fall along that path. A third path from the second inlet lane 432-4 to the first outlet lane 432-5 may be defined by the identifiers of the gates (e.g., 434-3, 434-4, 434-5, 434-6, 434-7, 434-8, 434-9) that fall along that path. A fourth path from the second inlet lane 432-4 to the second outlet lane 432-6 may be defined by the identifiers (e.g., 434-3, 434-4, 434-5, 434-6, 434-7, 434-10, 434-11) of the gates that fall along that path. As described below in connection with FIG. 4D, these different paths serve as the basis for vehicle trace clustering and linking nodes at connected lane gates 434 to define the driving trajectory.

In an example, the paths that include the target lane gate are defined within a particular search horizon. In FIG. 4C, the search horizon is indicated by the unfilled circles on particular lane gates 434. It may be that including more remote lane gates 434 in the search horizon does not impact the lateral position of the vehicles. As such, including additional lane gates 434 may unnecessarily weigh down the processor 108 in executing particular instructions. Moreover, if fewer lane gates 434 than those identified are used, some paths may be excluded from subsequent operations. In the particular example depicted in FIG. 4C, the search horizon includes three previous and three subsequent lane gates 434. However, other search horizons may be implemented based on several criteria, including the features (e.g., complexity) of the road network or road segment under analysis.

FIG. 4D depicts various vehicle traces that pass by the sixth, or target, lane gate 434-6. As described above, the lateral positions of the vehicles 220 vary by the path taken by the vehicles 220. For example, those vehicles 220 that travel from the first inlet lane 432-3 to the first outlet lane 432-5 are closer to the edge of the first lane 432-1 than those vehicles 220 that travel from the second inlet lane 432-3 to the second outlet lane 432-6. To identify the driving trajectory the autonomous vehicle 224 should take when navigating one of the particular paths, the cluster module 112 clusters the vehicle traces based on the vehicle trace path. In other words, the sequence of gate identifiers and the sequential traversal of associated gates allow vehicle traces to be clustered and mapped to a particular path through the target lane gate.

As described above, this may be done by comparing 1) the lane gate identifiers associated with a particular path with 2) the lane gate identifiers of the gates passed by the vehicle. For example, a vehicle trace of a vehicle 220 traveling from the first inlet lane 432-2 to the first outlet lane 432-5 will be identified as having passed through gates 434-1, 434-2, 434-5, 434-6, 434-7, 434-8, 434-9. As such, the vehicle trace for this vehicle 220 will be clustered with other vehicle traces that include the same gate sequence and will be associated with the first path, which shares this gate sequence. That is, the cluster module 112 includes instructions that cause the processor 108 to 1) assign each lane gate 434 of the network a gate identifier and 2) cluster the vehicle traces for which trace paths have the same sequence of gate identifiers. As described above, in one particular example, the cluster module 112 clusters the vehicle traces for which portions of the trace path in the search horizon before and after the target lane gate have the same sequence of gate identifiers.

In an example, vehicle traces associated with vehicles 220 that change lanes may be excluded from the clustering operation. For example, a vehicle 220 that changes from the first lane 432-1 to a second lane 432-2 (depicted in FIG. 4A) may obfuscate the generation of a driving trajectory. As such, the vehicle trace associated with this lane change is excluded before the clustering and determining a representative lateral position for the cluster. In an example, identifying a vehicle trace indicating a lane change, which should thus be excluded, may also be based on the sequence of lane gates associated with the vehicle trace. For example, any vehicle trace that conflicts with the connectivity of the lane gates may be excluded. As a specific example, any vehicle trace that indicates a vehicle passed from the eighth lane gate 434-8 to the eleventh lane gate 434-11 would be excluded as it indicates the movement of the vehicle between non-connected lane gates 434.

FIG. 4E depicts nodes 438 that indicate determined lateral positions for clusters at various gates. The nodes 438 depicted in FIG. 4E indicate the representative lateral position of the clusters associated with each node 438. For example, a first node 438-1 is depicted as a square and is associated with a first path from the first inlet lane 432-3, through the first lane 432-1, to the first outlet lane 432-5. As such, the first node 438-1 is positioned at a lateral position on the sixth lane gate 434-6 at a position that is representative of the lateral positions of the vehicle traces that make up the cluster of vehicle traces from the first inlet lane 432-3, through the first lane 432-1, to the first outlet lane 432-5. Similarly, a second node 438-2 is depicted as a diamond and is associated with a second path from the first inlet lane 432-3, through the first lane 432-1, to the second outlet lane 432-6 and is positioned at a lateral position on the sixth lane gate 434-6 at a position that is representative of the lateral positions of the vehicle traces that follow that path. Similarly, a third node 438-3 is depicted as a triangle and is associated with a third path from the second inlet lane 432-4, through the first lane 432-1, to the first outlet lane 432-5 and is positioned at a lateral position on the sixth lane gate 434-6 at a position that is representative of the lateral positions of the vehicle traces that follow that path. A fourth node 438-4 is depicted as a star and is associated with a fourth path from the second inlet lane 432-4, through the first lane 432-1, to the second outlet lane 432-6 and is positioned at a lateral position on the sixth lane gate 434-6 at a position that is representative of the lateral positions of the vehicle traces that follow that path.

The representative lateral position for a cluster may be determined in various ways. For example, the representative lateral position for the cluster may be determined by averaging the lateral positions of the clustered vehicle traces at the target lane gate. In another example, the representative lateral position may be the median or mean lateral position of the clustered vehicle traces. As such, the cluster module 112 includes instructions that cause the processor 108 to calculate an average or median of lateral positions of the vehicle traces that form the cluster and to use such as the representative lateral distance for the cluster.

As described above, the vehicle trace and the representative lateral position may be defined in various formats, including the absolute geographical position (i.e., latitude and longitude coordinates) or a relative position of the vehicle trace/cluster relative to the edges of the lane 432. For example, a start point of a lane gate 434 may be identified by a 0, while the end of the lane gate 434 may be identified by a 1 and the lateral position may be defined as some fractional value between 0 and 1.

As described above, this process may be repeated for different lane gates 434 in the road network. In FIG. 4E, the lateral position of the different clusters, of which in the present example there are four, are represented at various lane gates as nodes 438. As depicted in FIG. 4E, nodes 438 associated with different clusters may be identified as such. For example, in FIG. 4E, nodes 438 associated with the first path (i.e., from the first inlet lane 432-3 to the first outlet lane 432-5) are indicated as squares. In contrast, nodes 438 associated with other clusters are graphically identified with different icons (e.g., diamond, triangle, star). In an example, the different icons may be illustrative of the different alpha-numeric identifiers associated with each node 438. That is, in operation, the nodes 438 may be identified and differentiated by an alphanumeric indication.

FIG. 4F depicts the driving trajectories 450-1, 450-2, 450-3, and 450-4 that are generated based on the lateral positions of the respective clusters across multiple lane gates 434. That is, the trajectory module 114 smoothly connects the nodes 438 of connected lane gates 434 associated with a particular cluster. That is, the nodes 438 associated with the first path (indicated as squares in FIG. 4E) are connected via a smooth curve to define the driving trajectory 450-1 of the first path. Nodes 438 associated with the second path (indicated as diamonds in FIG. 4E) are connected via a smooth curve to define the driving trajectory 450-2 of the second path. Nodes 438 associated with the third path (indicated as triangles in FIG. 4E) are connected via a smooth curve to define the driving trajectory 450-3 of the third path. Nodes 438 associated with the fourth path (indicated as stars in FIG. 4E) are connected via a smooth curve to define the driving trajectory 450-4 of the fourth path.

In an example, determining which nodes 438 of adjacent lane gates 434 to connect may be performed in various ways. In a first example, the trajectory module 114 links the nodes 438 at connected lane gates 434 that are each associated with a shared vehicle trace. For example, a first vehicle trace may be represented by a node 438 on the fifth lane gate 434-5 and a node 438 on the sixth lane gate 434-6. Both nodes 438 may include metadata indicating that they represent the first vehicle trace. Based on this trace-indicating metadata, these nodes 438 on the fifth lane gate 434-5 and the sixth lane gate 434-6 may be connected to form part of the driving trajectory. In this example, the trajectory module 114 includes instructions that cause the processor 108 to place a node 438 on a target lane gate and connect the nodes 438 of connected lane gates that are each associated with a shared vehicle trace. This would be iterated for all lane gates 434, thus providing the driving trajectories 450-1, 450-2, 450-3, and 450-4 depicted in FIG. 4F.

In another example, the linking may be based on a mapping between nodes 438, clusters, and paths. For example, a first path through the target lane gate is identified as described above. This first path may be given an identifier. A cluster of vehicle traces is grouped based on this first path and similarly given an identifier. Nodes 438 that define the lateral position of the cluster at a particular lane gate 434 may also be given an identifier that indicates to which cluster they pertain. As such, the trajectory module 114 may link nodes 438 from connected lane gates 434 for which the indicator indicates that they are mapped to the same cluster/path. In this example, the trajectory module 114 includes instructions that cause the processor 108 to connect the nodes 438 of connected lane gates 434 that form part of the path. As such, the trajectory generation system 100 of the present specification considers the path-specific lateral positions of vehicles 220 that traverse the road, such that reliable, accurate, and real-world depicting autonomous vehicle trajectories may be provided for the safe and efficient control and/or maneuvering of the autonomous vehicle 224.

Figure 5:
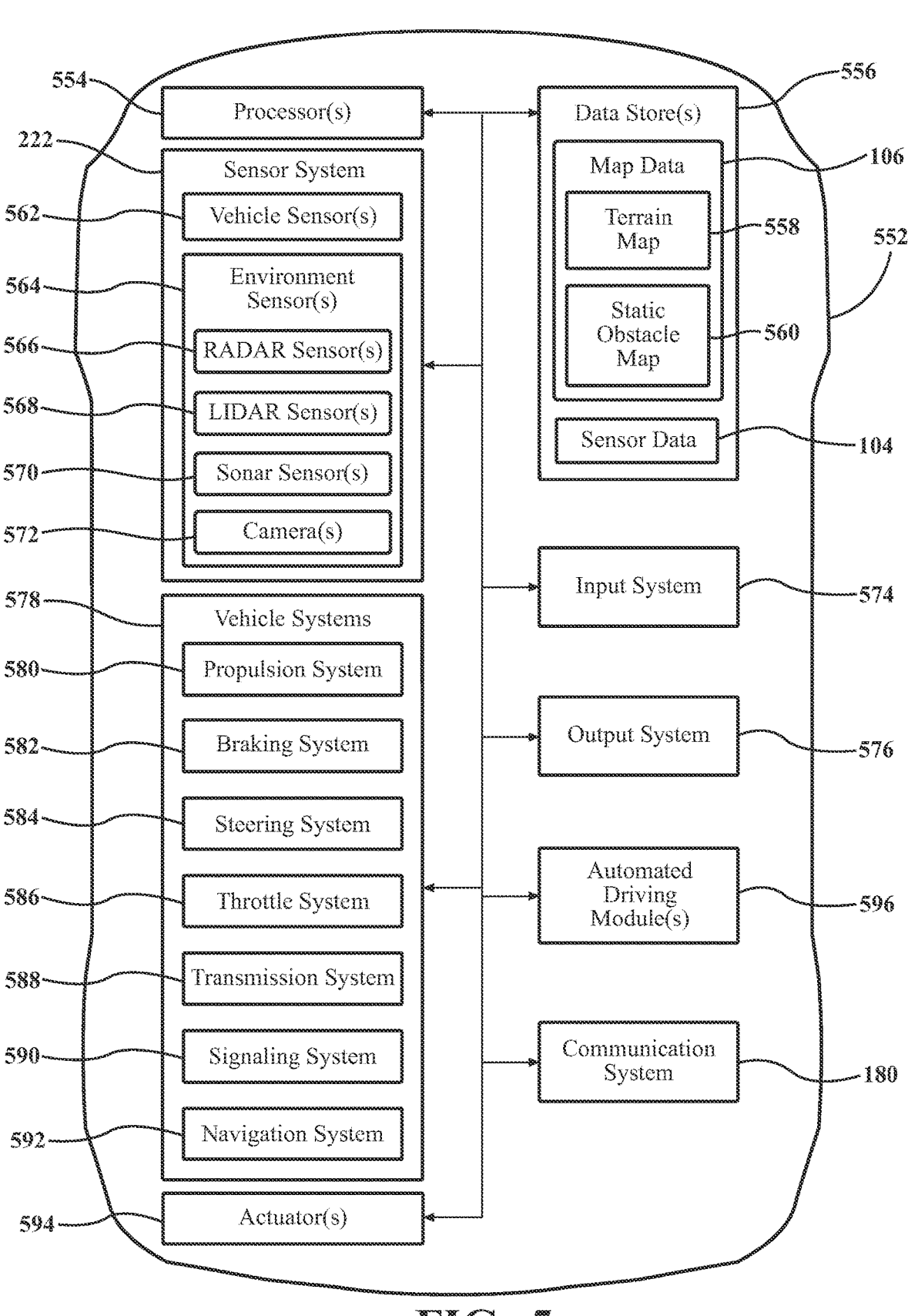
FIG. 5 illustrates one embodiment of a vehicle within which a trace and gate-based driving trajectory may be implemented.

FIG. 5 illustrates one embodiment of a vehicle 552 within which trace and gate-based driving trajectory may be implemented. As described above, the trajectory generation system 100 outputs a trajectory, and potentially other control signals, which are provided to an autonomous vehicle 220, which is an example of the vehicle 552 described herein. The vehicle 552 includes various elements. It will be understood that in various embodiments it may not be necessary for the vehicle 552 to have all of the elements shown in FIG. 5. The vehicle 552 can have different combinations of the various elements shown in FIG. 5. Further, the vehicle 552 can have additional elements to those shown in FIG. 5. In some arrangements, the vehicle 552 may be implemented without one or more of the elements shown in FIG. 5. While the various elements are shown as being located within the vehicle 552 in FIG. 5, it will be understood that one or more of these elements can be located external to the vehicle 552. Further, the elements shown may be physically separated by large distances. For example, as discussed, one or more components of the disclosed system can be implemented within a vehicle while further components of the system are implemented within a cloud-computing environment or other system that is remote from the vehicle 552.

In some instances, the vehicle 552 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 552 as manipulated by a user (e.g., human driver). In one or more arrangements, the vehicle 552 can be a manually-controlled vehicle that is configured to operate in only the manual mode.

In one or more arrangements, the vehicle 552 implements some level of automation in order to operate autonomously or semi-autonomously. As used herein, automated control of the vehicle 552 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 552 along a travel route via a computing system to control the vehicle 552 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 552.

The vehicle 552 includes one or more processors 554. In one or more arrangements, the processor(s) 554 can be a primary/centralized processor of the vehicle 552 or may be representative of many distributed processing units. For instance, the processor(s) 554 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 552.

The vehicle 552 can include one or more data stores 556 for storing one or more types of data. The data store 556 can be comprised of volatile and/or non-volatile memory.

Examples of memory that may form the data store 556 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 556 is a component of the processor(s) 554. In general, the data store 556 is operatively connected to the processor(s) 554 for use thereby. The term "operatively connected," as used throughout this description, can include direct or indirect connections, including connections without direct physical contact.

In one or more arrangements, the one or more data stores 556 include various data elements to support functions of the vehicle 552, such as semi-autonomous and/or autonomous functions. Thus, the data store 556 may store map data 106 and/or sensor data 104. The map data 106 includes, in at least one approach, maps of one or more geographic areas. In some instances, the map data 106 can include information about roads (e.g., lane and/or road maps), traffic control devices, road markings, structures, features, and/or landmarks in the one or more geographic areas. The map data 106 may be characterized, in at least one approach, as a high-definition (HD) map that provides information for autonomous and/or semi-autonomous functions.

In one or more arrangements, the map data 106 can include one or more terrain map(s) 558. The terrain map(s) 558 can include information about the ground, terrain, roads, surfaces, and/or other features of one or more geographic areas. The terrain map(s) 558 can include elevation data in the one or more geographic areas. In one or more arrangements, the map data 106 includes one or more static obstacle maps 560. The static obstacle map(s) 560 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 104 is data provided from one or more sensors of the sensor system 222. Thus, the sensor data 104 may include observations of a surrounding environment of the vehicle 552 and/or information about the vehicle 552 itself. In some instances, one or more data stores 556 located onboard the vehicle 552 store at least a portion of the map data 106 and/or the sensor data 104. Alternatively, or in addition, at least a portion of the map data 106 and/or the sensor data 104 can be located in one or more data stores 556 that are located remotely from the vehicle 552.

As noted above, the vehicle 552 can include the sensor system 222. The sensor system 222 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 222 and/or the one or more sensors can be operatively connected to the processor(s) 554, the data store(s) 556, and/or another element of the vehicle 552.

Various examples of different types of sensors will be described herein. However, it will be understood that the embodiments are not limited to the particular sensors described. In various configurations, the sensor system 222 includes one or more vehicle sensors 562 and/or one or more environment sensors. The vehicle sensor(s) 562 function to sense information about the vehicle 552 itself. In one or more arrangements, the vehicle sensor(s) 562 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 552.

As noted, the sensor system 222 can include one or more environment sensors 564 that sense a surrounding environment (e.g., external) of the vehicle 552 and/or, in at least one arrangement, an environment of a passenger cabin of the vehicle 552. For example, the one or more environment sensors 564 sense objects the surrounding environment of the vehicle 552. Such obstacles may be stationary objects and/or dynamic objects. Various examples of sensors of the sensor system 222 will be described herein. The example sensors may be part of the one or more environment sensors 564 and/or the one or more vehicle sensors 562. However, it will be understood that the embodiments are not limited to the particular sensors described. As an example, in one or more arrangements, the sensor system 222 includes one or more radar sensors 566, one or more LIDAR sensors 568, one or more sonar sensors 570 (e.g., ultrasonic sensors), and/or one or more cameras 572 (e.g., monocular, stereoscopic, RGB, infrared, etc.).

Continuing with the discussion of elements from FIG. 5, the vehicle 552 can include an input system 574. The input system 574 generally encompasses one or more devices that enable the acquisition of information by a machine from an outside source, such as an operator. The input system 574 can receive an input from a vehicle passenger (e.g., a driver/operator and/or a passenger). Additionally, in at least one configuration, the vehicle 552 includes an output system 576. The output system 576 includes, for example, one or more devices that enable information/data to be provided to external targets (e.g., a person, a vehicle passenger, another vehicle, another electronic device, etc.).

Furthermore, the vehicle 552 includes, in various arrangements, one or more vehicle systems 578. Various examples of the one or more vehicle systems 578 are shown in FIG. 5. However, the vehicle 552 can include a different arrangement of vehicle systems. It should be appreciated that although particular vehicle systems are separately defined, each or any of the systems or portions thereof may be otherwise combined or segregated via hardware and/or software within the vehicle 552. As illustrated, the vehicle 552 includes a propulsion system 580, a braking system 582, a steering system 584, a throttle system 586, a transmission system 588, a signaling system 590, and a navigation system 592.

The navigation system 592 can include one or more devices, applications, and/or combinations thereof to determine the geographic location of the vehicle 552 and/or to determine a travel route for the vehicle 552. The navigation system 592 can include one or more mapping applications to determine a travel route for the vehicle 552 according to, for example, the map data 106. The navigation system 592 may include or at least provide connection to a global positioning system, a local positioning system or a geolocation system.

In one or more configurations, the vehicle systems 578 function cooperatively with other components of the vehicle 552. For example, the processor(s) 554 and/or automated driving module(s) 596 can be operatively connected to communicate with the various vehicle systems 578 and/or individual components thereof. For example, the processor(s) 554 and/or the automated driving module(s) 596 can be in communication to send and/or receive information from the various vehicle systems 578 to control the navigation and/or maneuvering of the vehicle 552. The processor(s) 554 and/or the automated driving module(s) 596 may control some or all of these vehicle systems 578.

For example, when operating in the autonomous mode, the processor(s) 554 and/or the automated driving module(s) 596 control the heading and speed of the vehicle 552. The processor(s) 554 and/or the automated driving module(s) 596 cause the vehicle 552 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 552 includes one or more actuators 594 in at least one configuration. The actuators 594 are, for example, elements operable to move and/or control a mechanism, such as one or more of the vehicle systems 578 or components thereof responsive to electronic signals or other inputs from the processor(s) 554 and/or the automated driving module(s) 596. The one or more actuators 594 may include motors, pneumatic actuators, hydraulic pistons, relays, solenoids, piezoelectric actuators, and/or another form of actuator that generates the desired control.

As described previously, the vehicle 552 can include one or more modules, at least some of which are described herein. In at least one arrangement, the modules are implemented as non-transitory computer-readable instructions that, when executed by the processor 108, implement one or more of the various functions described herein. In various arrangements, one or more of the modules are a component of the processor(s) 554, or one or more of the modules are executed on and/or distributed among other processing systems to which the processor(s) 554 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 552 may include one or more automated driving modules 596. The automated driving module(s) 596, in at least one approach, receive data from the sensor system 222 and/or other systems associated with the vehicle 552. In one or more arrangements, the automated driving module(s) 596 use such data to perceive a surrounding environment of the vehicle. The automated driving module(s) 596 determine a position of the vehicle 552 in the surrounding environment and map aspects of the surrounding environment. For example, the automated driving module(s) 596 determines the location of obstacles or other environmental features including traffic signs, trees, shrubs, neighboring vehicles, pedestrians, etc.

The automated driving module(s) 596 either independently or in combination with the trajectory generation system 100 can be configured to determine travel path(s), current autonomous driving maneuvers for the vehicle 552, future autonomous driving maneuvers and/or modifications to current autonomous driving maneuvers based on data acquired by the sensor system 222 and/or another source. In general, the automated driving module(s) 596 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing machine-readable instructions that, when executed by the processor, cause the processor to:
generate a network of lane gates for a multi-lane road;
for a target lane gate in the network:
identify multiple gate paths through the target lane gate, a gate path is defined by a sequence of lane gates that includes the target lane gate;
form a cluster of vehicle traces passing through the target lane gate that have a trace path corresponding to a given one of the identified gate paths;
calculate a lateral position along the target lane gate for the cluster of vehicle traces; and
generate a driving trajectory based on lateral positions at multiple lane gates along the given one of the identified gate paths.

2. The system of claim 1, wherein the machine-readable instruction that, when executed by the processor, causes the processor to generate the network of lane gates, comprises a machine-readable instruction that, when executed by the processor, causes the processor to generate the network of lane gates across at least one of a multi-entrance segment of the multi-lane road and a multi-exit segment of the multi-lane road.

3. The system of claim 1, wherein the machine-readable instruction that, when executed by the processor, causes the processor to generate the driving trajectory comprises:
a machine-readable instruction that, when executed by the processor, causes the processor to place a node on the target lane gate, the node indicates the lateral position for the cluster at the target lane gate; and
at least one of:
a machine-readable instruction that, when executed by the processor, causes the processor to connect nodes of connected lane gates that are associated with a shared vehicle trace; or
a machine-readable instruction that, when executed by the processor, causes the processor to connect nodes of connected lane gates that form part of the given one of the identified gate paths.

4. The system of claim 1, wherein the machine-readable instruction that, when executed by the processor, causes the processor to calculate the lateral position along the target lane gate for the cluster comprises a machine-readable instruction that, when executed by the processor, causes the processor to calculate an average or median of lateral positions of the vehicle traces that form the cluster.

5. The system of claim 1, wherein the machine-readable instruction that, when executed by the processor, causes the processor to form the cluster of vehicle traces passing through the target lane gate comprises machine-readable instructions that, when executed by the processor, cause the processor to:
assign each lane gate of the network a gate identifier; and
form the cluster of vehicle traces for which trace paths have a same sequence of gate identifiers.

6. The system of claim 5, wherein the machine-readable instruction that, when executed by the processor, causes the processor to form the cluster of the vehicle traces for which trace paths have the same sequence of gate identifiers comprises a machine-readable instruction that, when executed by the processor, causes the processor to form the cluster of the vehicle traces for which portions of the trace paths in a search horizon before and after the target lane gate have the same sequence of gate identifiers.

7. The system of claim 1, wherein the machine-readable instructions further comprise machine-readable instructions that, when executed by the processor, cause the processor to:
calculate a vehicle attribute for the cluster at the target lane gate based on vehicle attributes associated with the vehicle traces at the target lane gate; and
generate time-based vehicle attributes for the given one of the identified gate paths by combining vehicle attributes for the cluster at the multiple lane gates along the given one of the identified gate paths.

8. The system of claim 1, wherein the machine-readable instruction that, when executed by the processor, causes the processor to generate the network of lane gates for the multi-lane road comprises machine-readable instructions that, when executed by the processor, cause the processor to:
acquire a road map of the multi-lane road; and
segment lanes of the road map into equidistant segments.

9. A non-transitory machine-readable medium comprising instructions that, when executed by a processor, cause the processor to:
generate a network of lane gates for a multi-lane road;
for a target lane gate in the network:
identify multiple gate paths through the target lane gate, a gate path is defined by a sequence of lane gates that includes the target lane gate;

form a cluster of vehicle traces passing through the target lane gate that have a trace path corresponding to a given one of the identified gate paths;

calculate a lateral position along the target lane gate for the cluster of vehicle traces; and generate a driving trajectory based on lateral positions for the cluster at multiple lane gates along the given one of the identified gate paths.

10. The non-transitory machine-readable medium of claim 9, wherein the instruction that, when executed by the processor, causes the processor to generate the network of lane gates comprises an instruction that, when executed by the processor, causes the processor to generate the network of lane gates across at least one of a multi-entrance segment of the multi-lane road and a multi-exit segment of the multi-lane road.

11. The non-transitory machine-readable medium of claim 9, wherein the instruction that, when executed by the processor, causes the processor to generate the driving trajectory comprises:

an instruction that, when executed by the processor, causes the processor to place a node on the target lane gate, the node indicates the lateral position for the cluster at the target lane gate; and at least one of:

an instruction that, when executed by the processor, causes the processor to connect nodes of connected lane gates that are associated with a shared vehicle trace; or an instruction that, when executed by the processor, causes the processor to connect nodes of connected lane gates that form part of the given one of the identified gate paths.

12. The non-transitory machine-readable medium of claim 9, wherein the instruction that, when executed by the processor, causes the processor to calculate the lateral position along the target lane gate for the cluster comprises an instruction that, when executed by the processor, causes the processor to calculate an average or median of lateral positions of the vehicle traces that form the cluster.

13. The non-transitory machine-readable medium of claim 9, wherein the instruction that, when executed by the processor, causes the processor to form the cluster of vehicle traces passing through the target lane gate comprises machine-readable instructions that, when executed by the processor, cause the processor to:

assign each lane gate of the network a gate identifier; and form the cluster of the vehicle traces for which trace paths have a same sequence of gate identifiers.

14. The non-transitory machine-readable medium of claim 13, wherein the instruction that, when executed by the processor, causes the processor to form the cluster of the vehicle traces for which trace paths have the same sequence of gate identifiers comprises an instruction that, when executed by the processor, causes the processor to form the cluster of the vehicle traces for which portions of the trace paths in a search horizon before and after the target lane gate have the same sequence of gate identifiers.

15. A method, comprising:

generating a network of lane gates for a multi-lane road;

for a target lane gate in the network:

identifying multiple gate paths through the target lane gate, a gate path is defined by a sequence of lane gates that includes the target lane gate;

forming a cluster of vehicle traces passing through the target lane gate that have a trace path corresponding to a given one of the identified gate paths;

calculating a lateral position along the target lane gate for the cluster of vehicle traces; and generating a driving trajectory based on lateral positions at multiple lane gates along the given one of the identified gate paths.

16. The method of claim 15, wherein generating the driving trajectory comprises:

placing a node on the target lane gate, the node indicates the lateral position for the cluster at the target lane gate; and at least one of:

connecting nodes of connected lane gates that are associated with a shared vehicle trace; or connecting nodes of connected lane gates that form part of the given one of the identified gate paths.

17. The method of claim 15, wherein calculating the lateral position along the target lane gate for the cluster comprises calculating an average or median of lateral positions of the vehicle traces that form the cluster.

18. The method of claim 15, wherein forming the cluster of vehicle traces passing through the target lane gate comprises:

assigning each lane gate of the network a gate identifier; and forming a cluster of the vehicle traces for which trace paths have a same sequence of gate identifiers.

19. The method of claim 18, wherein forming the cluster of vehicle traces for which trace paths have the same sequence of gate identifiers comprises forming the cluster of the vehicle traces for which portions of the trace paths in a search horizon before and after the target lane gate have the same sequence of gate identifiers.

20. The method of claim 15, further comprising guiding an autonomous vehicle along the driving trajectory based on an autonomous vehicle track being grouped with the cluster.

* * * * *